Sept. 26, 1944. R. J. STODDARD 2,359,259
TRUCK
Filed Dec. 22, 1941 3 Sheets-Sheet 3
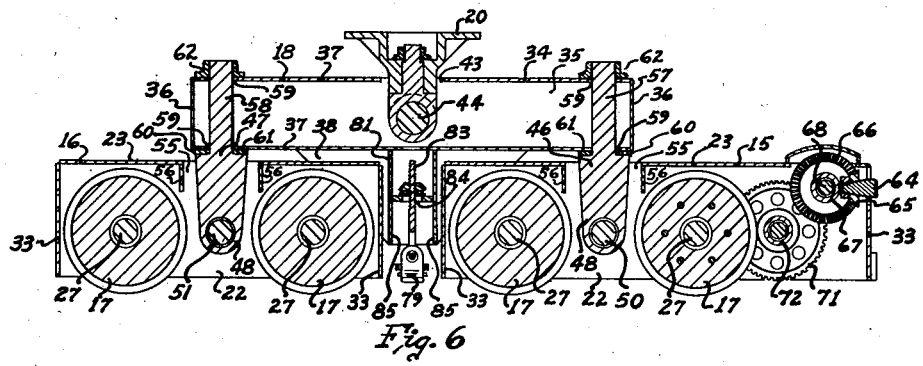
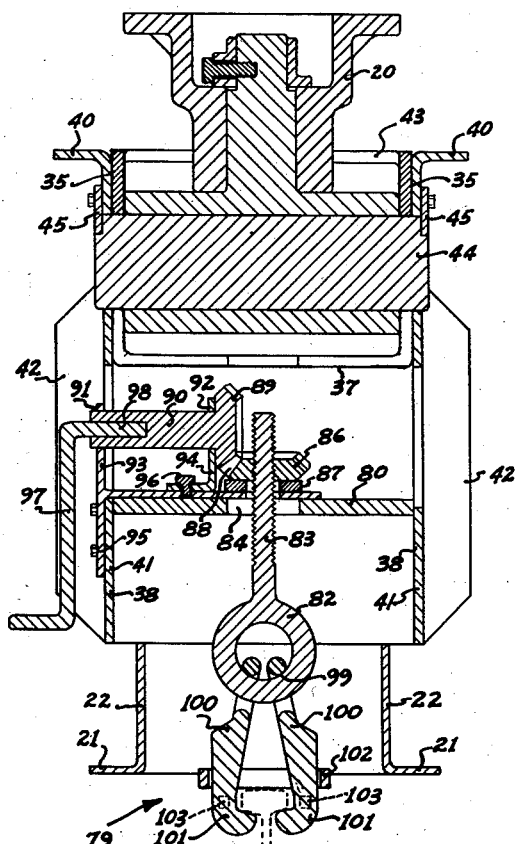
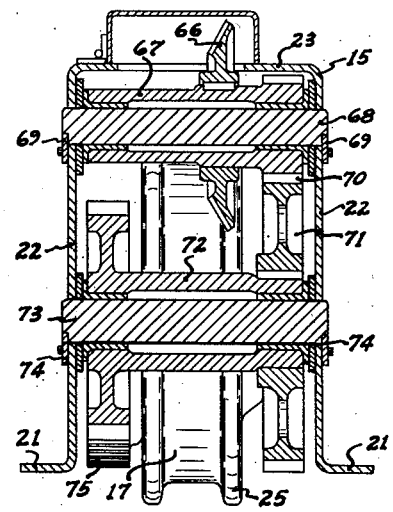
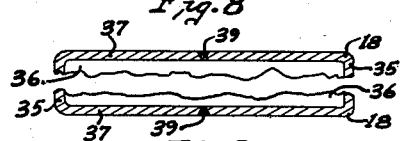
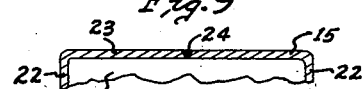
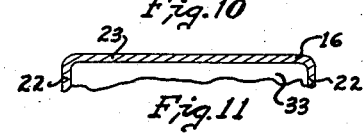
INVENTOR
ROBERT J. STODDARD
By J. H. Braddock
ATTORNEY Patented Sept. 26, 1944

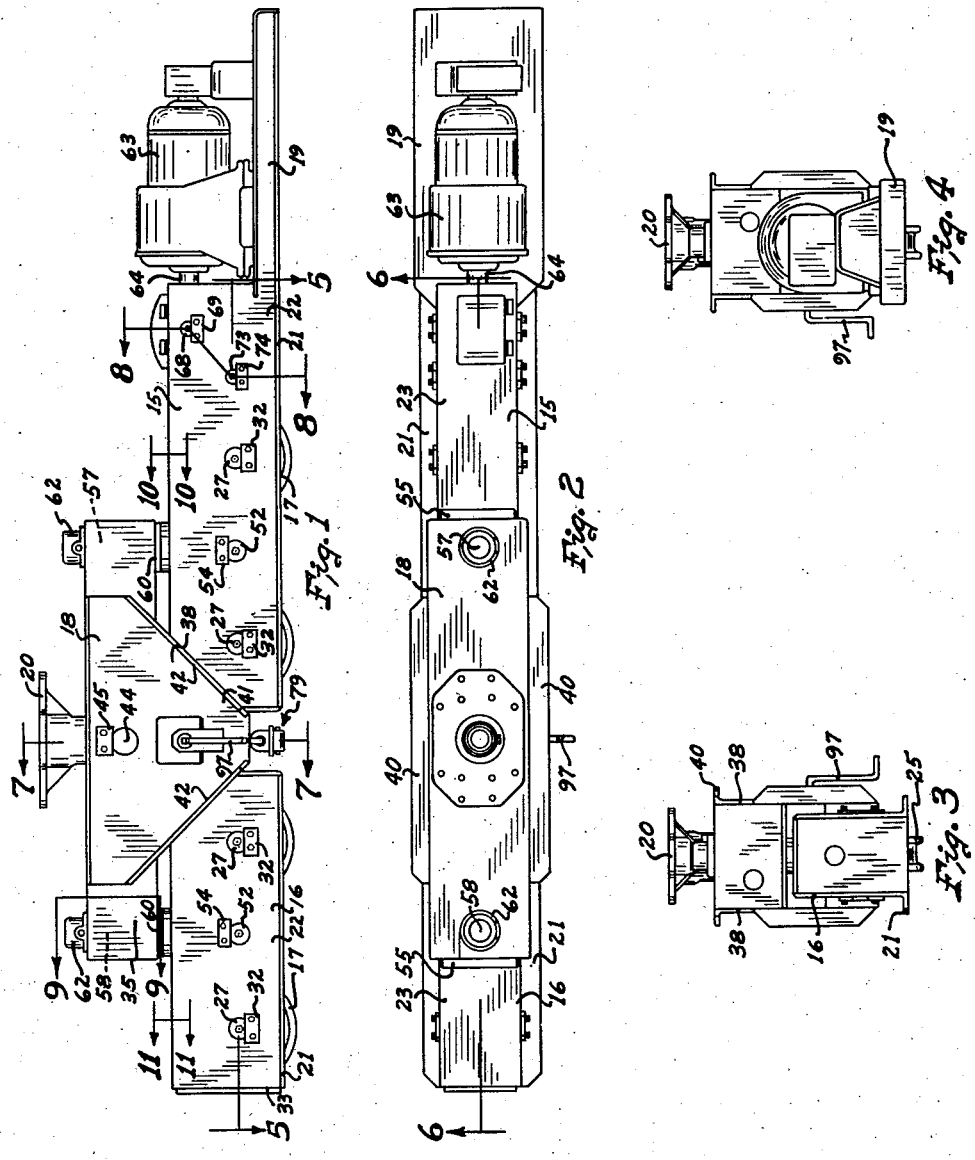

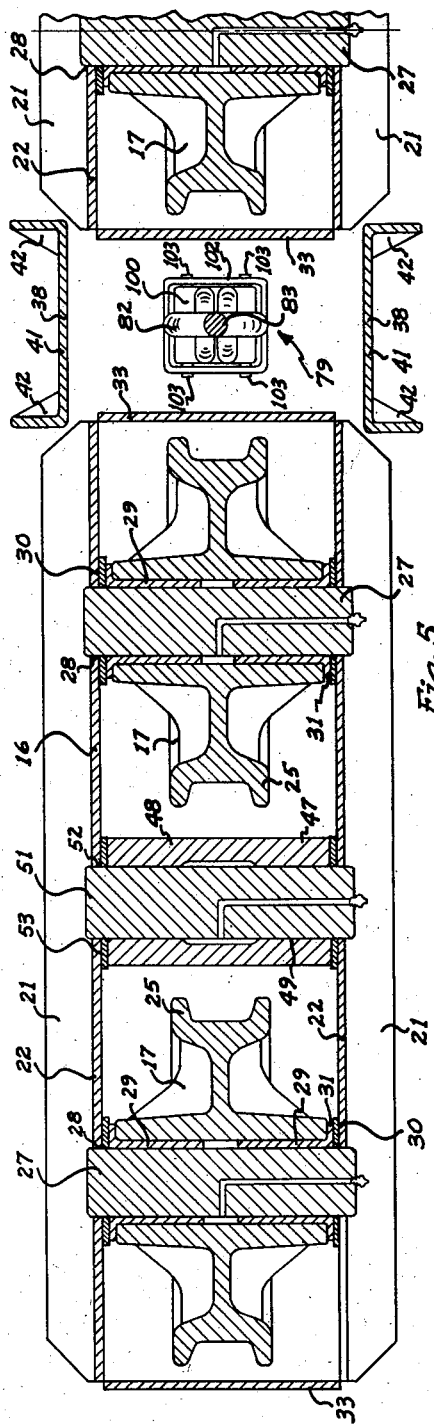
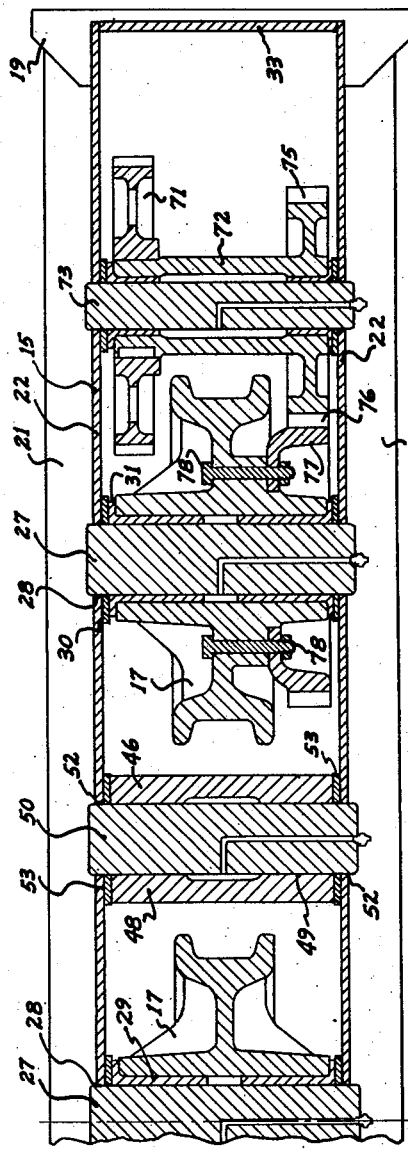
Fig. 5
Fig. 5A

2,359,259

UNITED STATES PATENT OFFICE 2,359,259

TRUCK

Robert J. Stoddard, St. Paul, Minn., assignor to American Hoist & Derrick Company, St. Paul, Minn., a corporation of Delaware Application December 22, 1941, Serial No. 424,135

12 Claims. (Cl. 105—157)

This invention relates to a truck, and has more especial relation to a crane truck, so-called.

An object of the invention is to provide a truck which will be of novel and improved construction.

A further object is to provide a so-called crane truck wherein will be incorporated various improved features and characteristics of construction which will be novel both as individual entities of the truck and in combination with each other.

A further object is to provide a truck which will include as parts thereof a plurality of entities or frames assembled together in novel and improved manner.

A further object is to provide a truck which will include spaced apart truck frames, one of which may desirably support a truck motor frame, and an equalizing girder frame between and assembled with said spaced apart truck frames in novel and improved manner.

A further object is to provide a truck which will include spaced apart truck frames and an equalizing girder frame between and telescopically and pivotally assembled with said truck frames.

A further object is to provide a truck which will include spaced apart truck frames and an equalizing girder frame between and pivotally assembled with said truck frames in novel and improved manner and so that each of said truck frames can have oscillatory movement in a vertical plane relative to said equalizing girder frame, and vice versa.

A further object is to provide a truck which will include spaced apart truck frames and an equalizing girder frame between and pivotally assembled with said truck frames in novel and improved manner and so that each of said truck frames can have oscillatory movement in a horizontal plane relative to said equalizing girder frame, and vice versa.

A further object is to provide a crane truck, so-called, which will include an equalizing girder frame adapted to support a usual truck center plate, and a plurality of spaced apart truck frames at either end of said equalizing girder frame pivotally associated with the equalizing girder frame in novel and improved manner and so that each of said truck frames can have oscillatory movement in both vertical and horizontal planes relative to said equalizing girder frame, and vice versa.

A further object is to provide a truck which will include an equalizing girder frame adapted to support a usual truck center plate, and a plurality of spaced apart truck frames arranged adjacent each other at either end of and beneath said equalizing girder frame and pivotally associated with the equalizing girder frame in supporting relation thereto and so that each of said truck frames can have oscillatory movement in vertical and horizontal planes relative to said equalizing girder frame, and vice versa.

A further object is to provide a truck of the present character which will include a wheel to be driven, and a novel and improved construction and arrangement for driving said wheel.

A further object is to provide a truck which will include spaced apart truck frames, an equalizing girder frame between and assembled with said spaced apart truck frames in such manner that there can be relative pivotal movement between the equalizing girder frame and each of the truck frames in both vertical and horizontal planes, supporting wheels upon said truck frame, and a novel and improved construction and arrangement for driving the truck.

A further object is to provide a crane truck which will include an equalizing girder frame adapted to support a usual truck center plate, a plurality of spaced apart truck frames arranged adjacent each other at either end of and beneath said equalizing girder frame and pivotally associated with the equalizing girder frame in supporting relation thereto and so that there can be relative pivotal movement in vertical and horizontal planes between said equalizing girder frame and each of said truck frames, supporting wheels upon the truck frames including a supporting wheel adapted to be driven, and a new and improved mechanism for driving said truck.

A further object is to provide in the truck a new and improved construction and arrangement, including a track clamp, selectively for fastening the truck in stationary position relatively to or upon a riding rail for said truck and for releasing the truck from said riding rail for movement therealong.

And a further object is to provide a truck of structure as illustrated in the drawings and hereinafter explicitly set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a side elevational view of a truck including the features and characteristics of the invention;

Fig. 2 is a top plan view of the truck of Fig. 1;

Fig. 3 is an end elevational view of the truck as seen from the left in Figs. 1 and 2;

Fig. 4 is an end elevational view of the truck as seen from the right in Figs. 1 and 2;

Figs. 5 and 5A, together, are an enlarged fragmentary horizontal longitudinal sectional view of the truck, taken substantially on line 5—5 in Fig. 1;

Fig. 6 is a vertical longitudinal sectional view of the truck, taken substantially on line 6—6 in Fig. 2;

Fig. 7 is an enlarged vertical transverse sectional view, taken substantially on line 7—7 in Fig. 1;

Fig. 8 is a detail sectional view, taken substantially on line 8—8 in Fig. 1;

Fig. 9 is a detail sectional view, taken substantially on line 9—9 in Fig. 1;

Fig. 10 is a detail sectional view, taken substantially on line 10—10 in Fig. 1; and Fig. 11 is a detail sectional view, taken substantially on line 11—11 in Fig. 1.

With respect to the drawings and the numerals of reference thereon, the truck includes a pair of spaced apart truck frames, denoted 15 and 16, respectively, each supported by wheels, represented 17. As shown, each truck frame 15, 16 is supported by a pair of wheels 17 arranged in tandem. An equalizing girder frame of the truck, between the truck frames 15 and 16, is designated 18. A truck motor frame 19 is supported by the truck frame 15. The truck here disclosed is adapted for use as a crane truck, so-called, for supporting one corner of a structure (not shown), and to this end a usual truck center plate 20, carried by the equalizing girder frame 18, is included.

Each truck frame 15, 16 consists of an inverted, elongated U-member having outwardly extending flanges 21, 21 upon the lower margins of its spaced apart legs or side walls 22, 22, opposite its base or upper wall 23. As disclosed, the U-member truck frame 15 is constituted as two Z-members welded at the longitudinal lines 24 to provide said truck frame 15 with flanges, whereas the U-member truck frame 16 is constituted as a single, or unwelded piece of metal providing said truck frame 16 with flanges. Both truck frames could be constituted after the fashion of either the truck frame 15 or the truck frame 16, or in some other suitable and convenient manner. As disclosed, the U-members of the truck frames 15 and 16 are of equal width. Said truck frames 15 and 16 could be duplicates, but desirably the truck frame 15 may be longer than the truck frame 16.

Each wheel 17 is flanged, as at 25, to be snugly ridable on a rail 26, shown in Fig. 7, and an axle 27 for each wheel is suitably and conveniently mounted, as at 28, in the oppositely disposed side walls 22, 22 of the U-member constituting the corresponding truck frame, 15 or 16 as the case may be, for the wheel. The axles 27 are, in the instance of each truck frame, spaced apart a distance to cause the wheels 17 carried by said axles to be in desired and predetermined spaced relation to each other. Said wheels 17 span substantially the distance between said side walls 22, 22, bushings 29 are disposed upon the axles 27 within the hubs of the wheels, and reinforcing pads 30, upon the side walls 22, 22 and upon the axles, together with flanges 31 upon said bushings 29, lie snugly between the wheel hubs and said side walls 22, 22. The axles 27 are made stationary in their bearings by employment of key bars 32.

Each of the truck frames 15 and 16 may be reinforced in any suitable and convenient fashion. As shown, the truck frames include opposite end walls, each denoted 33, which are perpendicular to and meet the opposite ends of the side and top walls 22, 22 and 23.

The equalizing girder frame 18 consists of an elongated, rectilinear member 34 including oppositely disposed, spaced apart vertical side walls 35, 35, oppositely disposed, spaced apart vertical end walls 36, 36 and oppositely disposed, spaced apart horizontal upper and lower walls 37, 37, as well as oppositely disposed, spaced apart vertical extension side walls 38, 38 welded or otherwise secured to and centrally of the outer surfaces of the vertical side walls 35, 35 and projecting downwardly from said vertical side walls. As disclosed, the rectilinear member 34 of the equalizing girder frame 18 is constituted as two members of substantially U-shape welded at the longitudinal lines 39, 39 to provide said rectilinear member, and reinforcement pieces at the ends of said welded together members, which reinforcement pieces are the vertical end walls 36, 36, but the rectilinear member 34 could be fashioned in some other suitable and convenient manner. Each vertical extension side wall 38 includes an outwardly projecting flange 40 at its top in about the plane of the upper wall 37 of the rectilinear member 34, and a lower portion 41 which extends to position somewhat below the elevation of the lower wall 37 of said rectilinear member 34. The lower, outer edges of each vertical extension side wall 38 converge in downward direction and each is provided with an outwardly extending flange 42. The upper wall 37 of the rectilinear member 34 is provided at its midportion with an opening 43 which freely receives the lower portion of the truck center plate 20. A cross pin 44 disposed in the spaced apart side walls 35, 35 and the spaced apart vertical side walls 38, 38 of the equalizing girder frame 18 pivotally supports said truck center plate 20 for swinging movement in a vertical plane extending longitudinally of said equalizing girder frame and of the truck. The front and rear walls of the opening 43 limit the extent to which the truck center plate 20 can oscillate, or rock, forwardly and rearwardly, upon the equalizing girder frame. The cross pin 44 is made stationary in its bearings by employment of key bars 45.

The vertical extension walls 38, 38 of the equalizing girder frame 18 are spaced farther apart than are the side walls 22, 22 of each of the truck frames 15 and 16, and said truck frames 15 and 16 are separately pivotally associated with said equalizing girder frame in such manner that the truck frames lie adjacent each other between, at opposite ends of and in spaced overlapping or telescoping relation to the lower portions 41 of said vertical extension walls 38, 38. That is, the opposite end edge portions of the vertical extension walls of the equalizing girder frame 18 overlie the adjacent end portions of the truck frames 15 and 16, respectively, in such manner that the side walls 22, 22 of each truck frame are between and in spaced relation to the vertical extension walls 38, 38, as well as in spaced relation to and beneath the rectilinear frame 34, and vertical pivot members, designated 46 and 47, respectively, secure the frames 15, 18 and 18, 16, respectively, to each other in such manner that there can be relative pivotal movement in both vertical and horizontal planes between the equalizing girder frame and each of the truck frames. The construction and arrangement are desirably such that when said truck frames and said equalizing girder frame are assembled, the lower extremities of the vertical extension walls 38, 38 of the equalizing girder frame are disposed at elevation slightly above the lower edges of the side walls 22, 22 of the truck frames, about as disclosed in Figs. 1, 3, 4, 6 and 7. Preferably, the lower edges of all of the side walls 22, 22, 22, 22 and the lower extremities of the vertical extension walls 38, 38 may be substantially horizontal when the truck frames 15 and 16 and the equalizing girder frame 18 are assembled together. The wheels 17 are all of the same size and desirably project downwardly to position below the lower edges of the side walls 22, 22 in the instance of each truck frame. More explicitly, each vertical pivot member 46, 47 includes a lower portion 48 there of rotatably supported, as at 49, upon a horizontal pivot pin, denoted 50 and 51, respectively, suitably and conveniently mounted, as at 52, in the side walls 22, 22 of the corresponding truck frame 15 or 16, as the case may be. The lower portions 48 of the vertical pivot members 46, 47 span substantially the distance between said side walls 22, 22, and reinforcing pads 53, upon the side walls 22, 22 and upon the horizontal pivot pins, lie snugly between said lower portions 48 and said side walls 22. The horizontal pivot pins 50 and 51 are made stationary in their bearings by employment of key bars 54. The reinforcing pads 53 situate the vertical pivot members 46, 47 at the transverse centers of the truck frames 15 and 16, and upper parts of the lower portions 48 of said vertical pivot members pass upwardly through openings 55 in the upper walls 23 of said truck frames. Transverse reinforcing walls 56 of the truck frames 15 and 16 are disposed at the opposite ends of the openings 55. There is a horizontal pivot pin, 50 or 51, as the case may be, midway between and in alinement with the wheels 17 in the instance of each of the truck frames 15 and 16. See Figs. 1, 5, 5A and 6. The vertical pivot members 46 and 47 are situated adjacent the opposite ends, respectively, of the equalizing girder frame 18, and a vertical pivot pin, represented 57 and 58, respectively, integral with and at the upper end portion of the corresponding vertical pivot member, 46 or 47, as the case may be, is snugly disposed in vertically alined openings 59, 59 in the upper and lower walls 37, 37 of the rectilinear member 34 of the equalizing girder frame 18. There is a set of vertically alined openings 59, 59 adjacent each of the opposite ends of said equalizing girder frame 18 disposed at the transverse center of the rectilinear member 34, and each vertical pivot pin 57, 58 is disposed at the transverse center of the truck frame, 15 or 16, by which carried. The construction and arrangement are such that when the vertical pivot pins 57 and 58 are situated within the different sets of vertically alined openings 59, 59, respectively, to cause the equalizing girder frame 18 to be pivotally supported upon the truck frames 15 and 16, reinforcement pieces 60, 60 upon the lower surface of the lower wall 37 of said rectilinear member 34 and about the vertical pivot pins 57 and 58 rest squarely upon horizontal annular shoulders 61, 61 of the vertical pivot pins and constituting the upper ends of the lower portions 48 of said vertical pivot members. Desirably, the horizontal annular shoulders 61, 61 may be disposed at elevation slightly above the upper walls 23 of the truck frames 15 and 16 in horizontal alinement with each other. See Figs. 1 and 6. The reinforcement pieces 60, 60 are adapted to have oscillatory movement relatively to or upon the horizontal annular shoulders 61, 61 by which carried. Caps upon the upper ends of the vertical pivot pins 57, 58 and at the upper surfaces of the upper wall 37 of the rectilinear member 34 are denoted 62, 62. Evidently, the vertical pivot members 46 and 47 are assembled with the truck frames 15 and 16 to permit relative oscillatory movement in a vertical plane of the equalizing girder frame 18 and said truck frames, and said vertical pivot members are assembled with said equalizing girder frame to permit oscillatory movement in a horizontal plane of the equalizing girder frame and the truck frames.

The truck motor frame 19 is disposed adjacent the end of the truck frame 15 which is opposite the equalizing girder frame 18, and suitably and conveniently supports an electric motor 63 including a driven shaft 64. As disclosed, said truck motor frame 19 is rigid with and in horizontal alinement with said truck frame 15.

The motor shaft 64 passes through an opening in the adjacent end wall of the truck frame 15 and fixedly carries a bevel pinion 65 which meshes with a bevel gear 66 fixed upon a spur pinion 67 suitably and conveniently rotatably mounted upon a cross pin 68 having its opposite ends fixed, as by key bars 69, in the side walls 22, 22 of said truck frame 15. The teeth 70 of the spur gear 67 mesh with the teeth of a spur gear 71 fixed upon a spur gear 72, and said spur gear 72 is suitably and conveniently rotatably mounted upon a cross pin 73 having its opposite ends fixed, as at 74, in said side walls 22, 22 of the truck frame 15. The teeth 75 of said spur gear 72 are in mesh with the teeth 76 of a spur gear 77 fixed, as at 78, to the wheel 17 of the truck frame 15 which is next adjacent the truck motor frame 19. The spur gear 77 is in surrounding relation to the hub of the wheel 17 by which said spur gear 77 is carried. Clearly, the wheel 17 having the spur gear 77 is adapted to be driven by the electric motor 63 through the instrumentality of the motor shaft 64, the bevel pinion 65, the bevel gear 66, the spur pinion 67, the spur gear 71, the spur gear 72, and the spur gear 77.

A track clamp, represented generally at 79, or a construction and arrangement selectively for fastening the truck in stationary position relative to or upon the rail 26 and for releasing the truck for movement along the rail, is best disclosed in Figs. 1, 2, 3, 4, 5, 6 and 7.

A horizontal platform 80, constituted as a part of a reinforcement structure 81 extending downwardly from the rectilinear member 34, is situated directly below the truck center plate 20 in considerably spaced relation to said truck center plate and at elevation somewhat above the rail 26. A bolt of the track clamp 79 is constituted as an eye 82 and an externally threaded shank 83 integral with the eye. The externally threaded shank 83 is disposed vertically within and passes upwardly through an opening 84 in the horizontal platform 80 situated at the midwidth of the equalizing girder frame 18 in spaced relation to the vertical walls 85, 85 of the reinforcement structure 81, and the eye 82 is at the lower end of said externally threaded shank 83 and at about the elevation of lower portions of the vertical extension walls 38, 38 of said equalizing girder frame. A bevel pinion 86, threadably engaged with the upper end portion of the externally threaded shank 83 and rested upon a washer 87 itself rested upon said horizontal platform 80 in surrounding relation to said externally threaded shank, is in mesh at 88 with a second bevel pinion 89 integral with a shaft 90 rotatably mounted in spaced bearings 91 and 92 provided by bracket members 93 and 94, respectively. The bracket member 93 is fixedly supported, as at 95, upon a vertical extension wall 38 of the equalizing girder frame 18, and a portion of said bracket member 93 is disposed upon the horizontal platform 80 beneath the washer 87. The bracket member 94 is fixedly supported, as at 96, upon the bracket member 93. Said bracket member 94 retains the second bevel pinion 89 engaged against the bevel pinion 86 in such manner as to retain said bevel pinion 86 down against the washer 87, and the bevel pinion 86 engages the second bevel pinion 89 to cause the shaft 90 and said second bevel pinion to be fixed against movement longitudinally in the spaced bearings 91 and 92. The bevel pinion 86 holds the second bevel pinion 89 against the bracket member 94. A crank 97 for accomplishing rotation of the second bevel pinion 89 is rigid, at 98, with the shaft 90 and is situated at an outer side of said equalizing girder frame to be readily accessible. The eye 82 supports, as at 99, oppositely disposed track clamp jaws 100, 100 for free swinging movement of the jaws from and toward each other. The track clamp jaws 100, 100 include lower hook portions, denoted 101, 101, which are complemental to each other and are adapted to be engaged about the opposite sides of the rail 26. A track clamp link 102 is slidable upon the track clamp jaws 100, 100, and limit lugs 103, 103 upon the track clamp jaws preclude the possibility of accidental removal of the link 102 from the jaws.

In practice, the track clamp jaws 100, 100 are placed upon the head of the rail 26 in about the manner as disclosed in Fig. 7 when it is the intention to fasten the truck to the rail, and the crank 97 is rotated in direction to cause the eye bolt to be elevated, thus to cause the hook portions 101, 101 of said clamp jaws to be pulled or forced up tight against the opposite sides and lower surfaces of the rail head. When the track clamp is secured upon said rail 26, the link 102 rests upon the top of the rail, as in said Fig. 7, in snug surrounding relation to intermediate portions of the clamp jaws 100, 100 just above the hook portions 101, 101, thus to insure the positions of said clamp jaws upon said rail. When the truck is to be released from the rail, the track clamp link 102 is lifted from its position as in Fig. 7 to released condition of the track clamp jaws 100, 100, said clamp jaws are swung outwardly away from each other to be clear of the head of said rail, and the crank 97 is rotated in direction to cause the eye bolt to be lifted to position causing the jaws 100, 100, with the link 102, to be situated above the elevation of, and thus clear of, the rail 26. That is, when the truck is in transit, the track clamp is, in its entirety, positioned above the elevation of the traveling rail.

The vertical pivot member 46 and 47 separately connect the truck frames 15 and 16, respectively, to the equalizing girder frame 18, and, save for the connection between said truck frames 15 and 16 through the medium of said equalizing girder frame 18 and said vertical pivot members 46 and 47, the truck frames are independent of each other. Provision is included for equalizing action between the girder frame 18 and each of the truck frames 15 and 16, and, hence, provision is also included for equalizing action between said truck frames 15 and 16 themselves. The truck frames are pivotally assembled with the equalizing girder frame in such manner that each of the truck frames can have oscillatory movement in both vertical and horizontal directions relative to the equalizing girder frame, and vice versa. Said equalizing girder frame is telescoped with said truck frames, and the truck frames lie in adjacent, alining relation to each other. The vertical extension walls 38, 38 of the equalizing girder frame are at the outer sides of the side walls 22, 22 of said truck frames 15 and 16 and spaced at sufficient distance from said side walls 22, 22 to preclude the possibility of interference with or hindrance of the equalizing action in horizontal direction, and the rectilinear member 34 is spaced at sufficient distance above the truck frames 15 and 16 to preclude the possibility of interference with or hindrance of the equalizing action in vertical direction.

What is claimed is:

1. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame including spaced apart upper and lower walls, and means mounted at spaced apart locations in the spaced apart upper and lower walls of the equalizing girder frame and in the side walls of each truck frame at location intermediate its axles pivotally supporting said equalizing girder frame upon said truck frames for swinging movement of the equalizing girder frame and the truck frames relatively to each other in vertical and horizontal directions.

2. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame including spaced apart upper and lower walls, means mounted at spaced apart locations in the spaced apart upper and lower walls of the equalizing girder frame and in the side walls of each truck frame at location intermediate its axles pivotally supporting said equalizing girder frame upon said truck frames for swinging movement of the equalizing girder frame and the truck frames relatively to each other in vertical and horizontal planes, a center plate, and means pivotally supporting said center plate upon said equalizing girder frame for swinging movement of the center plate in a vertical plane extending longitudinally of said truck.

3. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame including spaced apart upper and lower walls, and means constituted as vertical pivot pins mounted at spaced apart locations in the spaced apart upper and lower walls of the equalizing girder frame and vertical pivot members supporting said pivot pins mounted upon horizontal pivot pins situated in the side walls of each truck frame at location intermediate its axles supporting said equalizing girder frame upon said truck frames for swinging movement of the equalizing girder frame and the truck frames relatively to each other in vertical and horizontal directions.

4. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame including spaced apart upper and lower walls, means constituted as vertical pivot pins mounted at spaced apart locations in the spaced apart upper and lower walls of the equalizing girder frame and vertical pivot members supporting said vertical pivot pins mounted upon horizontal pivot pins situated in the side walls of each truck frame at location intermediate its axles supporting said equalizing girder frame upon said truck frames for swinging movement of the equalizing girder frame and the truck frames relatively to each other in vertical and horizontal directions, said equalizing girder frame including spaced apart side walls connected between its upper and lower walls, a center plate, and means pivotally supporting said center plate upon the side walls of said equalizing girder frame for swinging movement of the center plate in a vertical plane extending longitudinally of said truck.

5. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame consisting of spaced apart, horizontal upper and lower walls and spaced apart vertical side walls connected between said upper and lower walls, and means mounted at spaced apart locations in the horizontal upper and lower walls of the equalizing girder frame and in the side walls of each truck frame at location intermediate its axles pivotally supporting said equalizing girder frame upon said truck frames for swinging movement of the equalizing girder frame and the truck frames relatively to each other in vertical and horizontal directions.

6. A truck comprising spaced apart truck frames each consisting of an upper wall and spaced apart, downwardly extending side walls substantially perpendicular to said upper wall, axles mounted in the side walls of each of said truck frames in spaced relation to each other, supporting wheels spaced longitudinally along the truck carried by said axles, an equalizing girder frame consisting of spaced apart, horizontal upper and lower walls and spaced apart vertical side walls connected between said upper and lower walls, means mounted at spaced apart locations in the horizontal upper and lower walls of the equalizing girder frame and in the side walls of each truck frame at location intermediate its axles pivotally supporting said equalizing girder frame upon said truck frames for swinging movement of the equalizing girder frame and the truck frames relatively to each other in vertical and horizontal directions, a center plate projecting upwardly from the horizontal upper wall of said equalizing girder frame, and means pivotally supporting said center plate upon the vertical side walls of the equalizing girder frame for limited swinging movement of the center plate in a vertical plane extending longitudinally of said truck.

7. A truck comprising spaced apart truck frames each including spaced apart side walls, axles mounted in the side walls of each of said truck frames in spaced relation to each other, supporting wheels spaced longitudinally along the truck carried by said axles, an equalizing girder frame including spaced apart upper and lower walls, and means mounted at spaced apart locations in the spaced apart upper and lower walls of the equalizing girder frame and in the side walls of each truck frame pivotally supporting said equalizing girder frame upon said truck frames for swinging movement of the equalizing girder frame and the truck frames relatively to each other in vertical and horizonal directions.

8. The combination as specified in claim 7, a center plate, and means pivotally supporting said center plate upon said equalizing girder frame at location in a plane between said truck frames for swinging movement of the center plate in a vertical plane extending longitudinally of said truck.

9. A truck including spaced apart truck frames each including spaced apart side walls, axles mounted in the side walls of each of said truck frames in spaced relation to each other, supporting wheels spaced longitudinally along the truck carried by said axles, an equalizing girder frame including spaced apart upper and lower walls, and means constituted as vertical pivot pins mounted at spaced apart locations in the spaced apart upper and lower walls of the equalizing girder frame and vertical members supporting said pivot pins mounted upon horizontal pivot pins situated in the side walls of each truck frame supporting said equalizing girder frame upon said truck frames for swinging movement of the equalizing girder frame and the truck frames relatively to each other in vertical and horizontal directions.

10. A truck comprising spaced apart truck frames each including spaced apart side walls, axles mounted in the side walls of each of said truck frames in spaced relation to each other, supporting wheels spaced longitudinally along the truck carried by said axles, an equalizing girder frame consisting of spaced apart, horizontal upper and lower walls and spaced apart vertical side walls connected between said upper and lower walls, and means mounted at spaced apart locations in the horizontal upper and lower walls of the equalizing girder frame and in the side walls of each truck frame pivotally supporting said equalizing girder frame upon said truck frames for swinging movement of the equalizing girder frame and the truck frames relatively to each other in vertical and horizontal directions.

11. A truck comprising spaced apart truck frames each including spaced apart side walls, axles mounted in the side walls of each of said truck frames in spaced relation to each other, supporting wheels spaced longitudinally along the truck carried by said axles, an equalizing girder frame consisting of spaced apart, horizontal upper and lower walls and spaced apart vertical side walls connected between said upper and lower walls, means mounted at spaced apart locations in the horizontal upper and lower walls of the equalizing girder frame and in the side walls of each truck frame pivotally supporting said equalizing girder frame upon said truck frames for swinging movement of the equalizing girder frame and the truck frames relatively to each other in vertical and horizontal directions, a center plate projecting upwardly from said equalizing girder frame, and means pivotally supporting said center plate upon the vertical side walls of the equalizing girder frame for limited swinging movement of the center plate in a vertical plane extending longitudinally of said truck.

12. A truck comprising spaced apart truck frames each consisting of an upper wall and spaced apart, downwardly extending side walls, axles mounted in the side walls of each of said truck frames in spaced relation to each other, supporting wheels spaced longitudinally along the truck carried by said axles, an equalizing girder frame, and means mounted at spaced apart locations in the equalizing girder frame and in the side walls of each truck frame at location intermediate and at the elevation of its axles pivotally supporting said equalizing girder frame upon said truck frames for swinging movement of the equalizing girder frame and the truck frames relative to each other in vertical and horizontal directions.

ROBERT J. STODDARD.